United States Patent
Harel (10) Patent No.: US 9,980,237 B2
(45) Date of Patent: *May 22, 2018

(54) INDIVIDUALIZED GAIN CONTROL OF UPLINK PATHS IN REMOTE UNITS IN A DISTRIBUTED ANTENNA SYSTEM (DAS) BASED ON INDIVIDUAL REMOTE UNIT CONTRIBUTION TO COMBINED UPLINK POWER

(71) Applicant: Corning Optical Communications Wireless Ltd, Airport City (IL)

(72) Inventor: Dror Harel, Hod Hasharon (IL)

(73) Assignee: Corning Optical Communications Wireless Ltd, Airport (IL)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/618,237

(22) Filed: Jun. 9, 2017

(65) Prior Publication Data

US 2017/0280401 A1 Sep. 28, 2017

Related U.S. Application Data

(63) Continuation of application No. 14/667,845, filed on Mar. 25, 2015.
(Continued)

(51) Int. Cl.
*H04W 52/42* (2009.01)
*H04B 17/20* (2015.01)
(Continued)

(52) U.S. Cl.
CPC ............ *H04W 52/42* (2013.01); *H04B 7/024* (2013.01); *H04B 17/20* (2015.01); *H04W 52/52* (2013.01)

(58) Field of Classification Search
CPC .. H04B 10/2942; H04B 10/6931; H03G 3/20; H03G 2201/50; H03G 2201/70; H04W 52/00; H04W 52/52; H04W 52/386
See application file for complete search history.

(56) References Cited

U.S. PATENT DOCUMENTS 7,505,747 B2 3/2009 Solum
8,428,201 B1 4/2013 McHann, Jr. et al.
(Continued)

OTHER PUBLICATIONS

EP15161149 Search Report dated Jun. 18, 2015, European Patent Office.
(Continued)

*Primary Examiner* — Benjamin H Elliott, IV
(74) *Attorney, Agent, or Firm* — C. Keith Montgomery (57) ABSTRACT

Individualized gain control of uplink paths in remote units in a wireless communication system based on individual remote unit contribution to combined uplink power is disclosed. The gain level is reduced for uplink paths of individual remote units that provide higher power contribution to the combined uplink power of a combined uplink communications signal received in the central unit. This allows the initial uplink gain of all remote units to be set higher to increase sensitivity, because the gain of the remote units that provide higher power contributions to the combined uplink power in the central unit can be reduced if the combined uplink power exceeds the desired threshold power level. The gain of the remote units that provide higher power contributions to the combined uplink power in the central unit can be reduced without reducing the gain in the other remote units that would otherwise reduce their sensitivity.

17 Claims, 7 Drawing Sheets

Related U.S. Application Data (60) Provisional application No. 61/971,770, filed on Mar. 28, 2014.

(51) Int. Cl.
 H04B 7/024 (2017.01)
 H04W 52/52 (2009.01)

(56) References Cited

U.S. PATENT DOCUMENTS

| | | | |
|---|---|---|---|
| 8,428,510 | B2 | 4/2013 | Stratford et al. |
| 8,509,850 | B2 | 8/2013 | Zavadsky et al. |
| 8,532,242 | B2 | 9/2013 | Fischer et al. |
| 9,306,682 | B2 * | 4/2016 | Singh ............... H04B 17/12 |
| 9,420,542 | B2 | 8/2016 | Henia |
| 9,730,228 | B2 * | 8/2017 | Harel ............... H04W 72/0473 |
| 2003/0162516 | A1 | 8/2003 | Solum |
| 2004/0106387 | A1 | 6/2004 | Bauman et al. |
| 2007/0264009 | A1 * | 11/2007 | Sabat, Jr. ......... H04B 10/25752 398/5 |
| 2009/0265169 | A1 | 10/2009 | Dyba et al. |
| 2011/0237182 | A1 | 9/2011 | Stratford et al. |
| 2012/0052892 | A1 | 3/2012 | Braithwaite |
| 2012/0093011 | A1 | 4/2012 | Ranta-Aho et al. |
| 2013/0070816 | A1 | 3/2013 | Aoki et al. |
| 2013/0071112 | A1 | 3/2013 | Melester et al. |
| 2013/0077502 | A1 | 3/2013 | Gainey et al. |
| 2013/0095870 | A1 | 4/2013 | Phillips et al. |
| 2013/0252651 | A1 | 9/2013 | Zavadsky et al. |
| 2013/0260705 | A1 | 10/2013 | Stratford |
| 2014/0153919 | A1 | 6/2014 | Casterline et al. |
| 2014/0233435 | A1 | 8/2014 | Ko |
| 2015/0237618 | A1 | 8/2015 | Hanson et al. |
| 2015/0249965 | A1 | 9/2015 | Dussmann et al. |
| 2015/0282105 | A1 | 10/2015 | Harel |
| 2016/0066331 | A1 | 3/2016 | Harel |
| 2016/0095068 | A1 | 3/2016 | Henia |
| 2016/0360490 | A1 | 12/2016 | Henia |

OTHER PUBLICATIONS

EP15161149.8 Examination Report dated Jun. 21, 2016; European Patent Office.

* cited by examiner

INDIVIDUALIZED GAIN CONTROL OF UPLINK PATHS IN REMOTE UNITS IN A DISTRIBUTED ANTENNA SYSTEM (DAS) BASED ON INDIVIDUAL REMOTE UNIT CONTRIBUTION TO COMBINED UPLINK POWER

CROSS-REFERENCE TO RELATED APPLICATION

This application is a continuation of U.S. application Ser. No. 14/667,845 filed on Mar. 25, 2015 which claims the benefit of U.S. Provisional Application No. 61/971,770 filed on Mar. 28, 2014, the contents of which are relied upon and incorporated herein by reference in their entireties.

BACKGROUND

The technology of the present disclosure relates generally to distributed antenna systems (DASs) that support distributing communications services to remote units, and particularly to individualized automatic level control of remote units based on their respective contributions to combined uplink power.

Wireless communication is rapidly growing, with ever-increasing demands for high-speed mobile data communication. As an example, local area wireless services such as WiFi and wide area wireless services are widely deployed. Distributed communications systems communicate with wireless devices called "clients," "client devices," or "wireless client devices," which must reside within the wireless range or "cell coverage area" in order to communicate with an access point device. DASs are particularly useful to be deployed inside buildings or other indoor environments where client devices may not otherwise be able to effectively receive radio-frequency (RF) signals from a source, such as a base station for example. Example applications where DASs can be used to provide or enhance coverage for wireless services include public safety, cellular telephony, wireless local access networks (LANs), location tracking, and medical telemetry inside buildings and over campuses.

One approach to deploying a DAS involves the use of RF antenna coverage areas. Antenna coverage areas can be formed by remotely distributed antenna units, or remote units (RUs). The remote units each contain or are configured to couple to one or more antennas configured to support the desired frequency(ies) or polarization to provide the coverage areas. Antenna coverage areas can have a radius in the range from a few meters up to twenty meters. Combining a number of remote units creates an array of antenna coverage areas. Because the antenna coverage areas each cover small areas, there typically may be only a few users (clients) per antenna coverage area. This arrangement generates a uniform high quality signal enabling high throughput supporting the required capacity.

Figure 1:
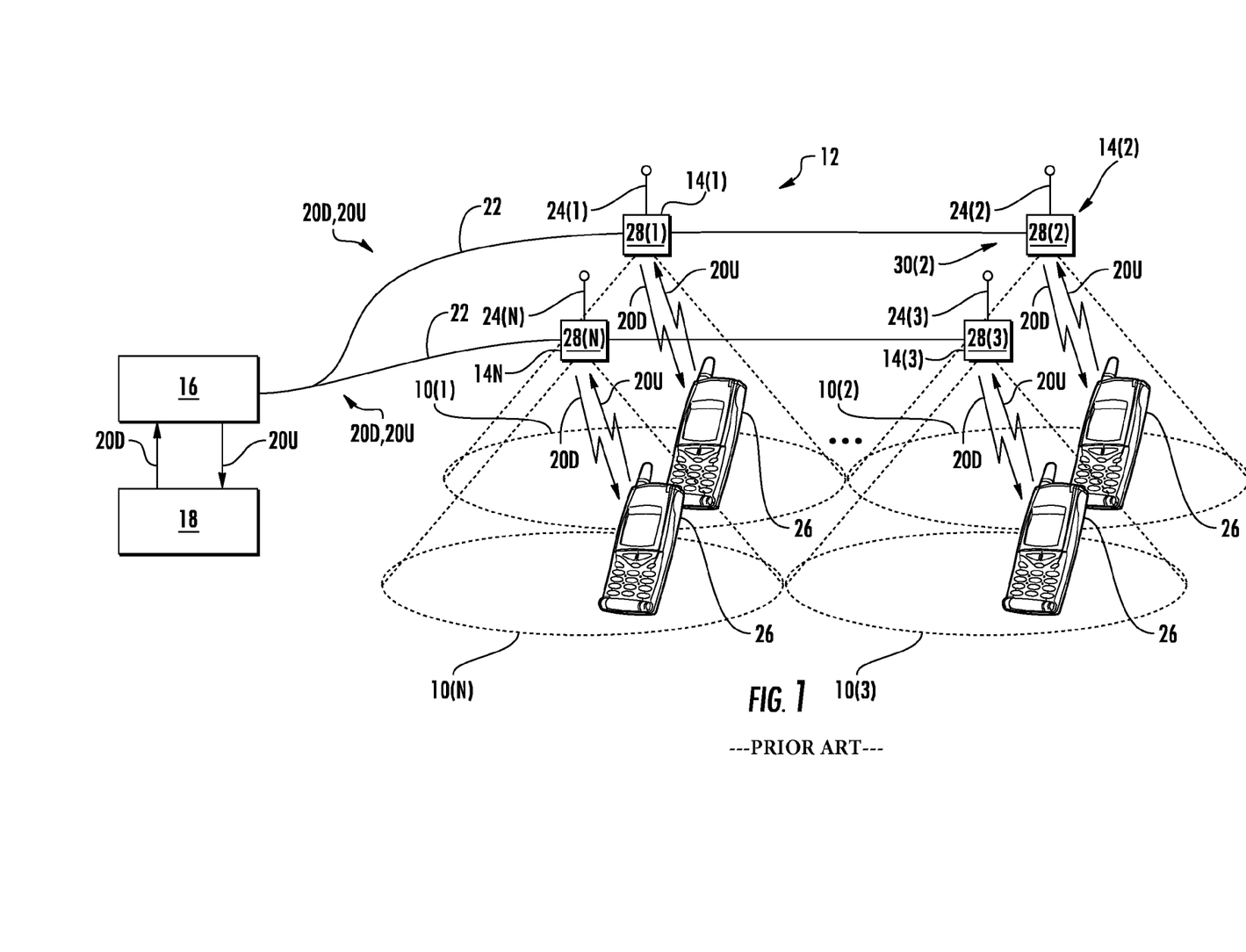
FIG. 1 is a schematic diagram of an exemplary distributed antenna system (DAS) capable of distributing radio frequency (RF) communications services to client devices.

As an example, FIG. 1 illustrates distribution of communications services to coverage areas 10(1)-10(N) of a DAS 12, wherein 'N' is the number of coverage areas. These communications services can include cellular services, wireless services such as RFID tracking, Wireless Fidelity (WiFi), local area network (LAN), WLAN, and combinations thereof, as examples. The coverage areas 10(1)-10(N) may be remotely located. In this regard, the remote coverage areas 10(1)-10(N) are created by and centered on remote antenna units 14(1)-14(N) connected to a central unit 16 (e.g., a head-end controller or head-end unit). The central unit 16 may be communicatively coupled to a base station 18. In this regard, the central unit 16 receives downlink communications signals 20D from the base station 18 to be distributed to the remote antenna units 14(1)-14(N). The remote antenna units 14(1)-14(N) are configured to receive downlink communications signals 20D from the central unit 16 over a communications medium 22 to be distributed to the respective coverage areas 10(1)-10(N) of the remote antenna units 14(1)-14(N). Each remote antenna unit 14(1)-14(N) may include an RF transmitter/receiver (not shown) and a respective antenna 24(1)-24(N) operably connected to the RF transmitter/receiver to wirelessly distribute the communications services to client devices 26 within their respective coverage areas 10(1)-10(N). The remote antenna units 14(1)-14(N) are also configured to receive uplink communications signals 20U from the client devices 26 in their respective coverage areas 10(1)-10(N) to be distributed to the base station 18. The size of a given coverage area 10(1)-10(N) is determined by the amount of RF power transmitted by the respective remote antenna unit 14(1)-14(N), the receiver sensitivity, antenna gain and the RF environment, as well as by the RF transmitter/receiver sensitivity of the client device 26. Client devices 26 usually have a fixed RF receiver sensitivity, so that the above-mentioned properties of the remote antenna units 14(1)-14(N) mainly determine the size of their respective remote coverage areas 10(1)-10(N).

In the DAS 12 in FIG. 1, the uplink gain in each remote antenna unit 14(1)-14(N) determines its sensitivity. Higher gain provides higher sensitivity (i.e., increased ability to decode weak uplink communications signals 20U). Each unit 14(1)-14(N) in the DAS 12 in FIG. 1 may include automatic level controllers (ALCs) 28(1)-28(N) that limit the power level of the received incoming uplink communications signals 20U to a predetermined power level. The ALCs 28(1)-28(N) can be used in the remote antenna units 14(1)-14(N) to avoid strong incoming uplink communications signals 20U overloading the communications signal processing circuitry (e.g., an amplifier) and distorting the uplink communications signal 20U. As another example, if the DAS 12 is an optical fiber-based DAS in which the remote antenna units 14(1)-14(N) convert the uplink communications signal 20U to optical uplink signals, a strong uplink communications signal 20U could overload the laser diode (not shown) used to convert the uplink communications signal 20U to optical uplink signals.

Further, the multiple received uplink communications signals 20U arriving at the remote antenna units 14(1)-14(N) are summed in the central unit 16. However, it may also be desired that the summed multiple received uplink communications signals 20U in the central unit 16 not exceed a defined threshold aggregated power in the central unit 16 or at the base station 18. Even though the individual signal level of each received uplink communications signals 20U in the remote antenna units 14(1)-14(N) can be controlled by the ALCs 28(1)-28(N) to be within power level limits of the individual remote antenna units 14(1)-14(N), the power level of the combined uplink communications signals 20U may be high enough to overload the signal processing circuitry in the central unit 16. Thus, to keep the combined uplink communications signals 20D in the central unit 16 below a desired maximum power level, the ALCs 28(1)-28(N) in the remote antenna units 14(1)-14(N) can be controlled to reduce the gain level of the individual uplink communications signals 20U received in each remote antenna unit 14(1)-14(N). However, the sensitivity of the uplink paths in the remote antenna units 14(1)-14(N) are reduced as a result. This may result in the signal level of a particular uplink communications signal 20U within a given remote antenna unit 14(1)-14(N) being lower than desired for processing within the remote antenna unit 14(1)-14(N) and/or not reaching the base station 18 with enough power.

Therefore, this creates a dilemma in that gain set by the ALCs 28(1)-28(N) must be set high enough to achieve the desired sensitivity but also avoid the combined uplink communications signals 20U from overloading the central unit 16 and/or the base station 18. The gain set by the ALCs 28(1)-28(N) may also need to be set high enough to allow uplink signals 20U to reach the central unit 16 and base station 18 without enough power.

SUMMARY

Embodiments disclosed herein include individualized gain control of uplink paths in remote units in a distributed antenna system (DAS) based on individual remote unit contribution to combined uplink power. In one embodiment, the combined uplink power of a combined uplink communications signal comprised of a combined plurality of received uplink communications signals in a central unit is measured. If the combined uplink power level of the combined uplink communications signal exceeds a defined central unit threshold uplink power level, the gain of certain uplink paths in the remote unit is reduced. The gain is reduced for the uplink paths of individual remote units, which provide higher power contribution to the combined uplink power of combined uplink communications signals in the central unit. This allows the initial uplink gain of all remote units to be set higher to increase sensitivity, because the gain of the remote units that provide higher power contributions to the combined uplink power in the central unit can be reduced without reducing the gain in the other remote units that would otherwise reduce their sensitivity. This is opposed to reducing the gain of uplink paths in the remote units equally in response to the combined uplink power being higher than desired, which would result in reduced sensitivity of all the remote units.

One embodiment of the disclosure relates to a central gain control system for providing individualized gain control of at least one uplink path in remote units in a distributed antenna system (DAS) based on an individual remote unit contribution to a combined uplink power. The central gain control system comprises a central uplink power measurement circuit. The central uplink power measurement circuit is coupled to a central uplink path in a central unit carrying a combined uplink communications signal comprised of a combined plurality of received uplink communications signals from a plurality of remote units. The central uplink power measurement circuit is configured to measure a combined uplink power of the combined uplink communications signal. The central uplink power measurement circuit is also configured to provide a combined uplink power measurement indicative of the combined uplink power of the combined uplink communications signal. The central gain control system also comprises a central controller. The central controller is configured to receive the combined uplink power measurement indicative of the combined uplink power of the combined uplink communications signal. The central controller is also configured to receive individual remote uplink power measurements of a remote uplink power for each remote uplink path of the plurality of remote units. The central controller is also configured to determine if the combined uplink power measurement is greater than a central uplink threshold power level. If the combined uplink power measurement is greater than the central uplink threshold power level, the central controller is also configured to identify as a high power remote uplink path, at least one remote uplink path in at least one remote unit among the plurality of remote units that has an individual remote uplink power measurement above a remote uplink threshold power level, and direct a remote uplink gain control circuit for at least one remote uplink path identified as a high power remote uplink path in at least one remote unit among the plurality of remote units, to reduce the uplink gain of the respective remote uplink path by a defined remote uplink gain level reduction.

Another embodiment of the disclosure relates to a method of providing individualized gain control of uplink paths in remote units in a DAS based on individual remote unit contribution to a combined uplink power. The method comprises measuring a combined uplink power of combined uplink communications signal comprised of a combined plurality of uplink communications signals received from a plurality of remote units, and providing a combined uplink power measurement indicative of the combined uplink power of the combined uplink communications signal. The method also comprises receiving individual remote uplink power measurements of a remote uplink power for each remote uplink path of the plurality of remote units. The method also comprises determining if the combined uplink power measurement is greater than a central uplink threshold power level. If the combined uplink power measurement is greater than a central uplink threshold power level, the method also comprises identifying as a high power remote uplink path, all remote uplink paths in at least one remote unit among the plurality of remote units that have an individual remote uplink power measurement above a remote uplink threshold power level, and directing a remote uplink gain control circuit for the remote uplink path identified as a high power remote uplink path in at least one remote unit, to reduce the uplink gain of the respective remote uplink path by a defined remote uplink gain level reduction.

Another embodiment relates to a DAS having a central unit configured to receive at least one downlink communications signal from a network. The central unit is also configured to distribute the received at least one downlink communications signal to a plurality of remote units, and to receive a plurality of uplink communications signals from the plurality of remote units. The central unit is also configured to combine the received plurality of uplink communications signals into a combined uplink communications signal in a central uplink path, and to distribute the received uplink communications signals to the network. The DAS also comprises a central uplink power measurement circuit coupled to the central uplink path in carrying the combined uplink communications signal. The central uplink power measurement circuit is configured to measure a combined uplink power of the combined uplink communications signal. The central uplink power measurement circuit is also configured to provide a combined uplink power measurement indicative of the combined uplink power of the combined uplink communications signal. The DAS also comprises a central uplink gain control circuit disposed in the central uplink path in the central unit, the central uplink gain control circuit configured to adjust a combined uplink gain of the central uplink path based on a combined uplink gain adjustment signal.

Further, the DAS also comprises a central controller configured to receive the combined uplink power measurement indicative of the combined uplink power of the combined uplink communications signal. The central controller is also configured to receive individual remote uplink power measurements of remote uplink power for each remote uplink path of the plurality of remote units, and to determine if the combined uplink power measurement is greater than a central uplink threshold power level. If the combined uplink power measurement is greater than the central uplink threshold power level, the central controller is also configured to identify as a high power remote uplink paths, at least one remote uplink path in at least one remote unit that have an individual remote uplink power measurement above a remote uplink threshold power level, and send at least one remote uplink gain control signal to a remote uplink gain control circuit for the remote uplink path identified as a high power remote uplink path in at least one remote unit.

Additional features are set forth in the detailed description, and in part, will be readily apparent to those skilled in the art. The foregoing general description and the following detailed description are merely exemplary, and are intended to provide an overview or framework to understand the nature and character of the claims. The drawings provide a further understanding and are incorporated in and constitute a part of this specification.

DETAILED DESCRIPTION

Figure 2:
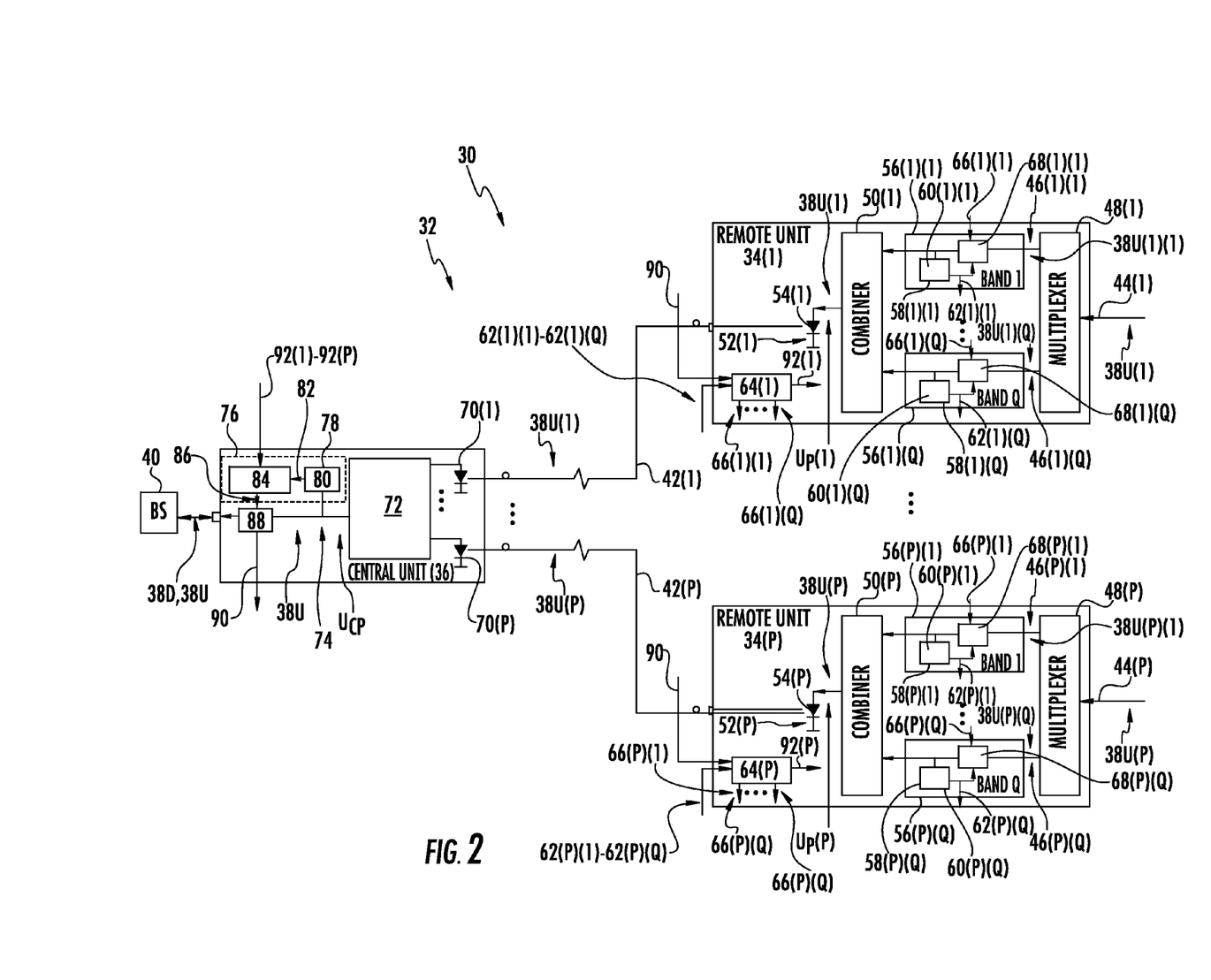
FIG. 2 is a schematic diagram of an exemplary DAS employing an exemplary gain control system configured to individually control the uplink path gain in the remote units based on the individual remote unit contribution to the combined uplink power.

FIG. 2 is a schematic diagram of an exemplary distributed antenna system (DAS) 30. As will be discussed in more detail below, the DAS 30 employs an exemplary gain control system 32 configured to individually control the uplink path gain in remote units 34(1)-34(P) based on individual remote unit 34 contribution to a combined uplink power $U_{CP}$ in a central unit 36. The gain is reduced for the uplink paths of individual remote units 34(1)-34(P) which provide higher power contribution to a combined uplink power $U_{CP}$ in the central unit 36. As will be discussed in more detail below, this allows the initial uplink gain of all remote units 34(1)-34(P) to be set higher to increase sensitivity, because the gain of the remote units 34(1)-34(P) that provide higher power contributions to the combined uplink power $U_{CP}$ in the central unit 36 can be reduced if the combined uplink power $U_{CP}$ exceeds the desired threshold power level. The gain of the remote units 34(1)-34(P) that provide higher power contributions to the combined uplink power $U_{CP}$ in the central unit 36 can be reduced without reducing the gain in the other remote units 34(1)-34(P) that would otherwise reduce their sensitivity. This is opposed to reducing the gain level of uplink paths in the remote units 34(1)-34(P) equally in response to a combined uplink power $U_{CP}$ in the central unit 36 being higher than desired, which would result in reduced sensitivity of all the remote units 34(1)-34(P). Before discussing the gain control system 32 of the DAS 30, the components of the DAS 30 are first described below.

As shown in FIG. 2, the central unit 36 is provided. The central unit 36 is configured to receive one or more downlink communications signals 38D from a base station 40 or other network device to be distributed to the plurality of remote units 34(1)-34(P). There are 'P' number of remote units 34 provided in the DAS 30. The central unit 36 is configured to distribute the received downlink communications signals 38D over a downlink communications medium (not shown) to the remote units 34(1)-34(P) to be distributed to client devices in communication, wired and/or wirelessly, with the remote units 34(1)-34(P). The central unit 36 is also configured to receive a plurality of uplink communications signals 38U(1)-38U(P) from the plurality of remote units 34(1)-34(P) to be distributed to the base station 40. As shown in FIG. 2, in this example, separate uplink communications medium 42(1)-42(P) are provided to communicatively couple the central unit 36 to each remote unit 34(1)-34(P), respectively. The remote units 34(1)-34(P) are each configured to receive the uplink communications signals 38U(1)-38U(P) over respective antenna ports 44(1)-44(P). The uplink communications signals 38U(1)-38U(P) are distributed over one or more remote uplink paths 46(1)-46(P) in the respective remote units 34(1)-34(P).

As shown in FIG. 2, each remote unit 34(1)-34(P) may include more than one remote uplink path 46(1)(1)-46(1)(Q)-46(P)(1)-46(P)(Q), where 'Q' is the number of remote uplink paths. For example, each remote uplink path 46(1)(1)-46(1)(Q)-46(P)(1)-46(P)(Q) may be configured to support a different frequency band of the possible uplink communications signals 38U(1)-38U(P) supported by the DAS 30. A multiplexer 48(1)-48(P) provided in the remote units 34(1)-34(P) is configured to separate out the different frequency bands in the respective received uplink communications signals 38U(1)-38U(P) to direct the separate frequency bands of uplink communications signals 38U(1)-38U(P) to the correct remote uplink path 46(1)(1)-46(1)(Q)-46(P)(1)-46(P)(Q). For example, the received uplink communications signal 38U(1) in remote unit 34(1) may be separated by the multiplexer 48(1) into uplink communications signals 38U(1)(1)-38U(1)(Q), where 'Q' is the number of frequency bands supported by the remote unit 34(1). Similarly, the received uplink communications signal 38U(P) in remote unit 34(P) may be separated by the multiplexer 48(P) into uplink communications signals 38U(P)(1)-38U(P)(Q) of 'Q' different frequency bands. The remote units 34(1)-34(P) include remote uplink combiners 50(1)-50(P). The remote uplink combiners 50(1)-50(P) are configured to combine the respective uplink communications signals 38U(1)(1)-38U(1)(Q)-38U(P)(1)-38U(P)(Q) from each remote uplink path 46(1)(1)-46(1)(Q)-46(P)(1)-46(P)(Q) in its respective remote unit 34(1)-34(P) into combined uplink signals 38U(1)-38U(P) to be distributed to the central unit 36.

With continuing reference to FIG. 2, the DAS 30 is an optical fiber-based DAS. In this regard, each remote unit 34(1)-34(P) has an electrical-to-optical (E-O) converter 52(1)-52(P) in the form of laser diodes 54(1)-54(P) that are configured to convert the electrical uplink communications signals 38U(1)-38U(P) into optical uplink communications signals 38U(1)-38U(P) to be distributed over optical uplink communications medium 42(1)-42(P) to the central unit 36. Because the uplink communications signals 38U(1)-38U(P) may be received by the remote units 34(1)-34(P) at power levels that could overload the laser diodes 54(1)-54(P) and thus cause non-linearity issues with E-O signal conversions, each remote uplink path 46(1)(1)-46(1)(Q)-46(P)(1)-46(P)(Q) in the remote units 34(1)-34(P) in this example includes a remote uplink gain control system 56(1)(1)-56(1)(Q)-56(P)(1)-56(P)(Q). The remote uplink gain control systems 56(1)(1)-56(1)(Q)-56(P)(1)-56(P)(Q) are configured to limit the uplink power $U_P(1)$-$U_P(P)$ of the combined uplink signals 38U(1)-38U(P) applied to the laser diodes 54(1)-54(P) to respective remote uplink threshold power level. Note that if a remote unit 34 only had one remote uplink path 46, only one remote uplink gain control system 56 could be provided in that remote unit 34.

In this regard, with continuing reference to FIG. 2, each remote uplink gain control system 56(1)(1)-56(1)(Q)-56(P)(1)-56(P)(Q) includes a remote uplink power measurement circuit 58(1)(1)-58(1)(Q)-58(P)(1)-58(P)(Q). The remote uplink power measurement circuits 58(1)(1)-58(1)(Q)-58(P)(1)-58(P)(Q) in this example are comprised of power detectors 60(1)(1)-60(1)(Q)-60(P)(1)-60(P)(Q) that are configured to measure power or another measurement that can be correlated to power. Each power detector 60(1)(1)-60(1)(Q)-60(P)(1)-60(P)(Q) is configured measure a remote uplink power of the received uplink communications signals 38U(1)(1)-38U(1)(Q)-38U(P)(1)-38U(P)(Q) in the remote uplink paths 46(1)(1)-46(1)(Q)-46(P)(1)-46(P)(Q) after being attenuated by remote uplink gain control circuits 68(1)(1)-68(1)(Q)-68(P)(1)-68(P)(Q) discussed below. The power detectors 60(1)(1)-60(1)(Q)-60(P)(1)-60(P)(Q) are also configured to provide remote uplink power measurements 62(1)(1)-62(1)(Q)-62(P)(1)-62(P)(Q) indicative of the remote uplink power of the respective attenuated uplink communications signal 38U(1)(1)-38U(1)(Q)-38U(P)(1)-38U(P)(Q) in the respective remote uplink paths 46(1)(1)-46(1)(Q)-46(P)(1)-46(P)(Q) to respective remote controllers 64(1)-64(P) provided in the remote units 34(1)-34(P).

With continuing reference to FIG. 2, the remote controllers 64(1)-64(P) determine if any remote uplink gains in the respective remote uplink paths 46(1)(1)-46(1)(Q)-46(P)(1)-46(P)(Q) should be adjusted or limited based on the measured respective remote uplink power of the received uplink communications signals 38U(1)(1)-38U(1)(Q)-38U(P)(1)-38U(P)(Q). If so, the remote controllers 64(1)-64(P) are configured to issue respective remote uplink gain adjustment signals 66(1)(1)-66(1)(Q)-66(P)(1)-66(P)(Q) to respective remote uplink gain control circuits 68(1)(1)-68(1)(Q)-68(P)(1)-68(P)(Q) provided in the remote uplink gain control systems 56(1)(1)-56(1)(Q)-56(P)(1)-56(P)(Q). The remote uplink gain control circuits 68(1)(1)-68(1)(Q)-68(P)(1)-68(P)(Q) may be provided as automatic gain level (ALCs) or automatic gain controllers (AGCs), as non-limiting examples. The remote uplink gain control circuits 68(1)(1)-68(1)(Q)-68(P)(1)-68(P)(Q) are disposed in the respective remote uplink paths 46(1)(1)-46(1)(Q)-46(P)(1)-46(P)(Q). The remote uplink gain control circuits 68(1)(1)-68(1)(Q)-68(P)(1)-68(P)(Q) are configured to adjust the remote uplink gain in the remote uplink paths 46(1)(1)-46(1)(Q)-46(P)(1)-46(P)(Q) based on respective received remote uplink gain adjustment signals 66(1)(1)-66(1)(Q)-66(P)(1)-66(P)(Q) from the respective remote unit controllers 64(1)-64(P). As discussed above, the remote uplink gain control circuits 68(1)(1)-68(1)(Q)-68(P)(1)-68(P)(Q) may also independently limit the remote uplink gain in the remote uplink paths 46(1)(1)-46(1)(Q)-46(P)(1)-46(P)(Q) can be employed to limit the remote uplink power $U_P(1)$-$U_P(P)$ applied to the laser diodes 54(1)-54(P) of the respective remote units 34(1)-34(P) to prevent overloading.

Note that in this example, a dedicated remote controller 64(1)-64(P) is provided in each remote unit 34(1)-34(P), the functionality of the remote controllers 64(1)-64(P) could be part of another internal controller in the respective remote units 34(1)-34(P) or a controller external to the remote units 34(1)-34(P).

With continuing reference to FIG. 2, as discussed above, the optical uplink communications signals 38U(1)-38U(P) are received by the central unit 36 over the uplink communications medium 42(1)-42(P). In this embodiment, the central unit 36 includes uplink optical-to-electrical (O-E) converters 70(1)-70(P) to convert the optical uplink communications signals 38U(1)-38U(P) back to electrical uplink communications signals 38U(1)-38U(P). The electrical uplink communications signals 38U(1)-38U(P) are then processed (e.g., amplified) and combined by uplink combiner 72 into a combined uplink communications signal 38U in a central uplink path 74. To prevent the central combined uplink power $U_{PC}$ of the combined uplink communications signal 38U in the central unit 36 from exceeding a central uplink threshold power level, a central uplink gain control system 76 is provided in the central unit 36. The central uplink gain control system 76 includes a central uplink power measurement circuit 78. The central uplink power measurement circuit 78 is coupled to the central uplink path 74 carrying the combined uplink communications signal 38U. The central uplink power measurement circuit 78 in this example is comprised of power detectors 80 that are each configured to measure power or another measurement that can be correlated to power. The power detector 80 is configured to measure the central combined uplink power $U_{PC}$ of the combined uplink communications signal 38U in the central uplink path 74. The power detector 80 is also configured to provide a central uplink power measurement 82 to a central controller 84 provided in the central unit 36.

With continuing reference to FIG. 2, the central controller 84 determines if the central combined uplink power $U_{PC}$ in the central uplink paths 74 should be adjusted or limited to prevent an overload condition. If so, the central controller 84 is configured to issue a central uplink gain adjustment signal 86 to a central uplink gain control circuit 88 provided in the central uplink gain control system 76. The central uplink gain control circuit 88 may be an ALC or AGC, as examples. The central uplink gain control circuit 88 is disposed in the central uplink paths 74 and is configured to limit or adjust the central combined uplink power $U_{PC}$ of the combined uplink communications signal 38U in the central uplink path 74. For example, the central uplink gain control circuit 88 may be configured to limit the combined uplink power $U_{PC}$ of the combined uplink communications signal 38U to be above a central uplink threshold power level to prevent overloading of the base station 40 that receives the uplink communications signal 38U from the central unit 36.

With continuing reference to the DAS 30 in FIG. 2, though the remote uplink power of each received uplink communications signals 38U(1)-38U(P) in the remote units 34(1)-34(P) can be controlled by remote uplink gain control systems 56(1)(1)-56(1)(Q)-56(P)(1)-56(P)(Q) to be within desired power limits or below a remote uplink threshold power level, the power level of the uplink communications signals 38U(1)-38U(P) when combined into the combined uplink communications signal 38U in the central unit 36 may still have a high enough combined uplink power $U_{PC}$ to overload the base station 40. For example, if the upload communications signals 38U(1)-38U(P) of remote uplink power level Pi (dBm) exist at each remote unit 34(1)-34(P), the summed remote uplink power of the combined upload communications signals 38U of N remote units will be equal to Pi+(10×Log(N)+G), wherein G is the gain in the remote uplink paths 46(1)(1)-46(1)(Q)-46(P)(1)-46(P)(Q) assuming G is equal for all remote uplink paths 46(1)(1)-46(1)(Q)-46(P)(1)-46(P)(Q) for all frequency bands of the upload communications signals 38U(1)-38U(P). Thus, to keep the combined uplink power $U_{PC}$ of the combined uplink communications signal 38U in the central unit 36 below a desired maximum power level, the remote uplink gain control systems 56(1)(1)-56(1)(Q)-56(P)(1)-56(P)(Q) in the remote units 34(1)-34(P) can be additionally controlled by the central controller 84 in the central unit 36 to reduce the remote uplink gain of the individual uplink communications signals 38U(1)(1)-38U(1)(Q)-38U(P)(1)-38U(P)(Q) received in each remote unit 34(1)-34(P) based on the combined uplink power $U_{PC}$ in the central unit 36.

In this regard, the central controller 84 in the DAS 30 in FIG. 2 can send a remote uplink gain control signal 90 to the remote controllers 64(1)-64(P) for the remote units 34(1)-34(P). In response, the remote controllers 64(1)-64(P) can issue the remote uplink gain adjustment signals 66(1)(1)-66(1)(Q)-66(P)(1)-66(P)(Q) to respective remote uplink gain control circuits 68(1)(1)-68(1)(Q)-68(P)(1)-68(P)(Q) provided in the remote uplink gain control systems 56(1)(1)-56(1)(Q)-56(P)(1)-56(P)(Q) to limit the remote uplink power of the individual uplink communications signals 38U(1)(1)-38U(1)(Q)-38U(P)(1)-38U(P)(Q). Thus, the gain control system 32 in the DAS 30 in FIG. 2 is configured to adjust the remote uplink gains of the remote uplink paths 46(1)(1)-46(1)(Q)-46(P)(1)-46(P)(Q) based on either the remote uplink power in the respective remote uplink paths 46(1)(1)-46(1)(Q)-46(P)(1)-46(P)(Q), or the combined uplink power $U_{PC}$ of the combined uplink communications signal 38U in the central unit 36.

However, if the remote gain level of the remote uplink paths 46(1)(1)-46(1)(Q)-46(P)(1)-46(P)(Q) is adjusted to reduce the remote gain level due to the combined uplink power $U_{PC}$ of the combined uplink communications signal 38U exceeding the central uplink power threshold, the sensitivity of the remote uplink paths 46(1)(1)-46(1)(Q)-46(P)(1)-46(P)(Q) in the remote units 34(1)-34(P) are reduced as a result. In the case where a weak uplink communications signal 38U(1)(1)-38U(1)(Q)-38U(P)(1)-38U(P)(Q) is also received at that uplink path, together with the strong signal that caused the gain reduction of that uplink path, the power level of the weak uplink communications signal 38U(1)(1)-38U(1)(Q)-38U(P)(1)-38U(P)(Q) might go below the sensitivity threshold. In other words, weak uplink signal 38U(1)(1)-38U(1)(Q)-38U(P)(1)-38U(P)(Q) would be a lower power level than desired when reaching the base station 40, and as a result not being able to be decoded within the base station 40. Therefore, this creates a dilemma in that the gain of the remote units 34(1)-34(P) should be set high for increased sensitivity and/or to allow low power level uplink communications signals 38U(1)(1)-38U(1)(Q)-38U(P)(1)-38U(P)(Q) to pass through the remote uplink paths 46(1)(1)-46(1)(Q)-46(P)(1)-46(P)(Q) of the remote units 34(1)-34(P) with high enough power to reach the base station 40, but also avoid the high power level uplink signals 38U(1)(1)-38U(1)(Q)-38U(P)(1)-38U(P)(Q) causing the combined uplink power $U_{PC}$ of the combined uplink communications signal 38U to exceed the central uplink threshold power level of the central unit 36 and/or the base station 40.

In this regard, the central controller 84 in the central unit 36 is configured to provide individualized gain control of remote uplink paths 46(1)(1)-46(1)(Q)-46(P)(1)-46(P)(Q) in the remote units 34(1)-34(P) based on individual remote unit 34(1)-34(P) contribution to combined uplink power $U_{PC}$ of the combined uplink communications signal 38U in the central unit 36. This is opposed to reducing the remote gain level of remote uplink paths 46(1)(1)-46(1)(Q)-46(P)(1)-46(P)(Q) in the remote units 34(1)-34(P) equally in response to the combined uplink power $U_{PC}$ of the combined uplink communications signal 38U in the central unit 36 being higher than desired or exceeding a desired central uplink power threshold.

Figure 3:
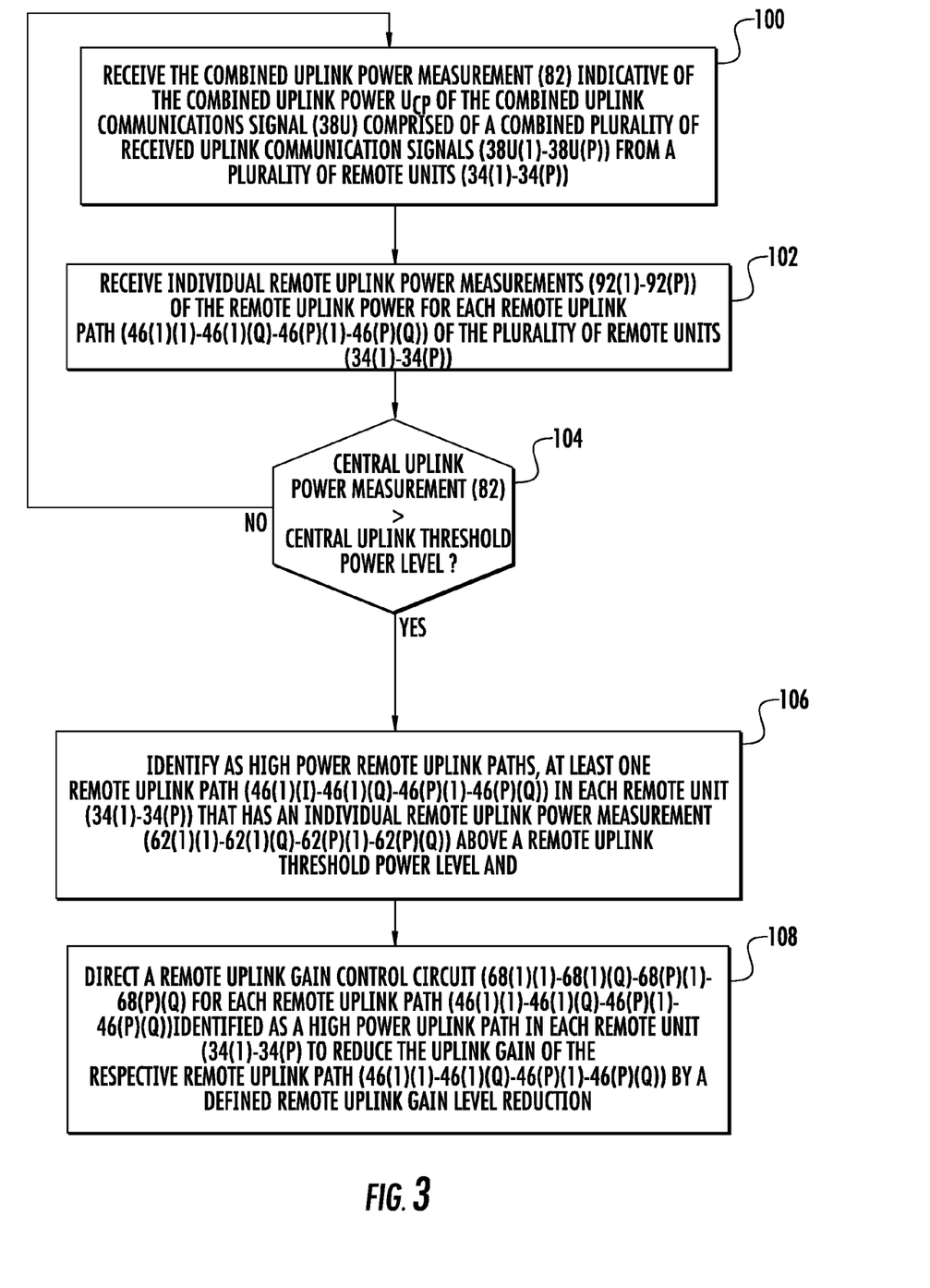
FIG. 3 is a flowchart illustrating an exemplary process of the gain control system in the DAS in FIG. 2 individually controlling the uplink path gain in the remote units based on the individual remote unit contribution to the combined uplink power.
Figure 4:
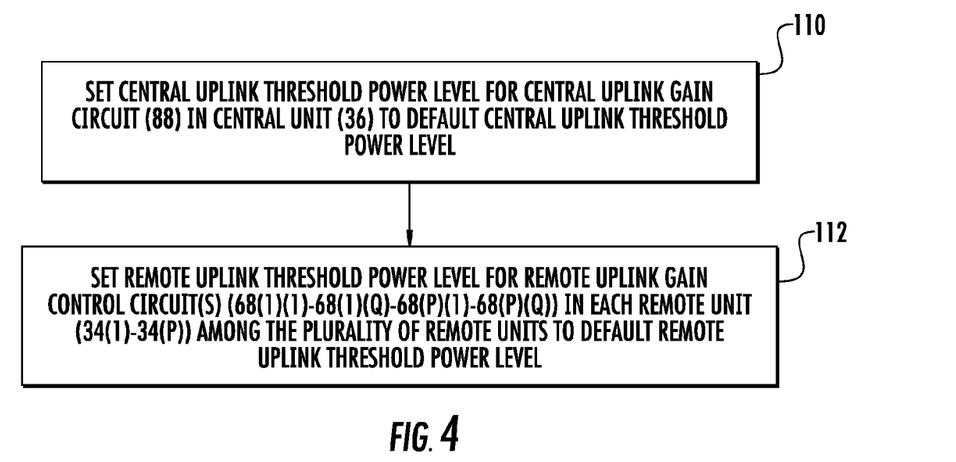
FIG. 4 is a flowchart illustrating an exemplary process of the gain control system in the DAS in FIG. 2 setting a default central uplink threshold power level to be used for gain control of the central uplink path in the central unit and a default remote uplink threshold power level in remote units to be used for individualized gain control of the remote uplink paths in the remote units.

In this regard, in this example DAS 30 in FIG. 2 and as illustrated in the flowchart in FIG. 3, the central controller 84 is configured to receive the central uplink power measurement 82 indicative of the combined uplink power $U_{CP}$ of the combined uplink communications signal 38U on the central uplink path 74 (block 100 in FIG. 3). The central controller 84 is also configured to receive individual remote uplink power measurements 92(1)-92(P) for each remote uplink path 46(1)(1)-46(1)(Q)-46(P)(1)-46(P)(Q) in the remote units 34(1)-34(P) (block 102 in FIG. 3). The central controller 84 is configured to determine if the central uplink power measurement 82 indicative of the combined uplink power $U_{PC}$ of the combined uplink communications signal 38U is greater than a central uplink threshold power level (decision 104 in FIG. 3). For example, the central uplink threshold power level may be set to a default central uplink threshold power level. For example, as illustrated in the flowchart in FIG. 4, the central uplink threshold power level may be set and stored by the central controller 84 as a default central uplink threshold power level during initialization of the DAS 30 or during operation (block 110 in FIG. 4).

With continuing reference back to FIG. 2, if the central uplink power measurement 82 is not greater than the central uplink threshold power level (decision 104 in FIG. 3), the central controller 84 can repeat the process by returning back to block 100 in FIG. 3. However, if the central uplink power measurement 82 is greater than the central uplink threshold power level (decision 104 in FIG. 3), the central controller 84 is further configured to identify as a high power remote uplink paths, those remote uplink paths 46(1)(1)-46(1)(Q)-46(P)(1)-46(P)(Q) in each remote unit 34(1)-34(P) that have an individual remote uplink power measurement 62(1)(1)-62(1)(Q)-62(P)(1)-62(P)(Q) above a respective remote uplink threshold power level configured in the respective remote uplink gain control system 56(1)(1)-56(1)(Q)-56(P)(1)-56(P)(Q) (block 106 in FIG. 3). The high power remote uplink paths may additionally be identified as those remote uplink paths 46(1)(1)-46(1)(Q)-46(P)(1)-46(P)(Q) within a defined power level (e.g. within 10 dB) from the respective remote uplink threshold power level. For example, the remote uplink threshold power levels for the remote uplink paths 46(1)(1)-46(1)(Q)-46(P)(1)-46(P)(Q)

may be set to a single default remote uplink threshold power level used for all remote uplink paths 46(1)(1)-46(1)(Q)-46(P)(1)-46(P)(Q), or to individual default remote uplink threshold power levels specific to each of the remote uplink paths 46(1)(1)-46(1)(Q)-46(P)(1)-46(P)(1)-46(P)(Q). For example, as illustrated in the flowchart in FIG. 4, the remote uplink threshold power level(s) may be set and stored by the remote controllers 64(1)-64(P) as a default remote uplink threshold power level(s) during initialization of the DAS 30 or during operation (block 112 in FIG. 4). The central controller 84 may provide the default remote uplink threshold power level(s) to the remote controllers 64(1)-64(P). In this manner, the remote uplink paths 46(1)(1)-46(1)(Q)-46(P)(1)-46(P)(Q) are identified that can be reduced in remote uplink gain without risking the respective uplink communications signals 38U(1)(1)-38U(1)(Q)-38U (P)(1)-38U(P)(Q) not having sufficient uplink power to reach the central unit 36 and/or base station 40 with sufficient desired power.

With continuing reference back to FIG. 2, the central controller 84 is then configured to send the remote uplink gain control signal 90 to direct any remote uplink gain control circuit 68(1)(1)-68(1)(Q)-68(P)(1)-68(P)(Q) for each remote uplink path 46(1)(1)-46(1)(Q)-46(P)(1)-46(P)(Q) identified as a high power remote uplink paths in each remote unit 34(1)-34(P), to reduce the remote uplink gain of the respective identified high power remote uplink paths 46(1)(1)-46(1)(Q)-46(P)(1)-46(P)(Q) by a defined or calculated remote uplink gain level reduction (block 108 in FIG. 3). As one non-limiting example, the defined remote uplink gain level reduction may be two (2) dB. The defined remote uplink gain level reduction may be set to a programmed value or calculated. In this manner, the gain level of remote uplink paths 46(1)(1)-46(1)(Q)-46(P)(1)-46(P)(Q) in remote units 34(1)-34(P) that provide higher power contributions to the combined uplink power $U_{CP}$ of the combined uplink communications signal 38U can be reduced, without reducing the gain level in remote uplink paths that did not provide higher power contributions to the combined uplink power $U_{CP}$ of the combined uplink communications signal 38U of remote units 34(1)-34(P) and by that not reducing their sensitivity, which mean that their respective received uplink communications signals 38U(1)(1)-38U(1)(Q)-38U(P)(1)-38U(P)(Q) do not reach the central unit 36 with enough power.

Note that central controller 84 may repeat the process in blocks 100-108 in FIG. 3 periodically or during operation of the DAS 30. The process may be repeated, because the uplink communications signals 38U(1)(1)-38U(1)(Q)-38U(P)(1)-38U(P)(Q) received at each remote unit 34(1)-34(P) may continuously change (e.g., new calls are initiated or terminated, subscribers get closer to the DAS antennas or get away from the DAS antennas).

In another embodiment, the central controller 84 is configured to receive individual remote uplink power measurements 92(1)-92(P) for the total remote power in combined remote uplink paths 46(1)-46(P) in the remote units 34(1)-34(P). Thus, the central controller 84 can still identify high power remote uplink paths in each remote unit 34(1)-34(P), to reduce the remote uplink gain of the respective identified high power remote uplink paths. However, in this scenario, the central controller 84 would only be able to identify as high power remote uplink paths, the combined remote uplink paths 46(1)-46(P) for each remote unit 34(1)-34(P) and not individual remote uplink paths 46(1)(1)-46(1)(Q)-46(P)(1)-46(P)(Q) on a frequency band basis.

Figure 5:
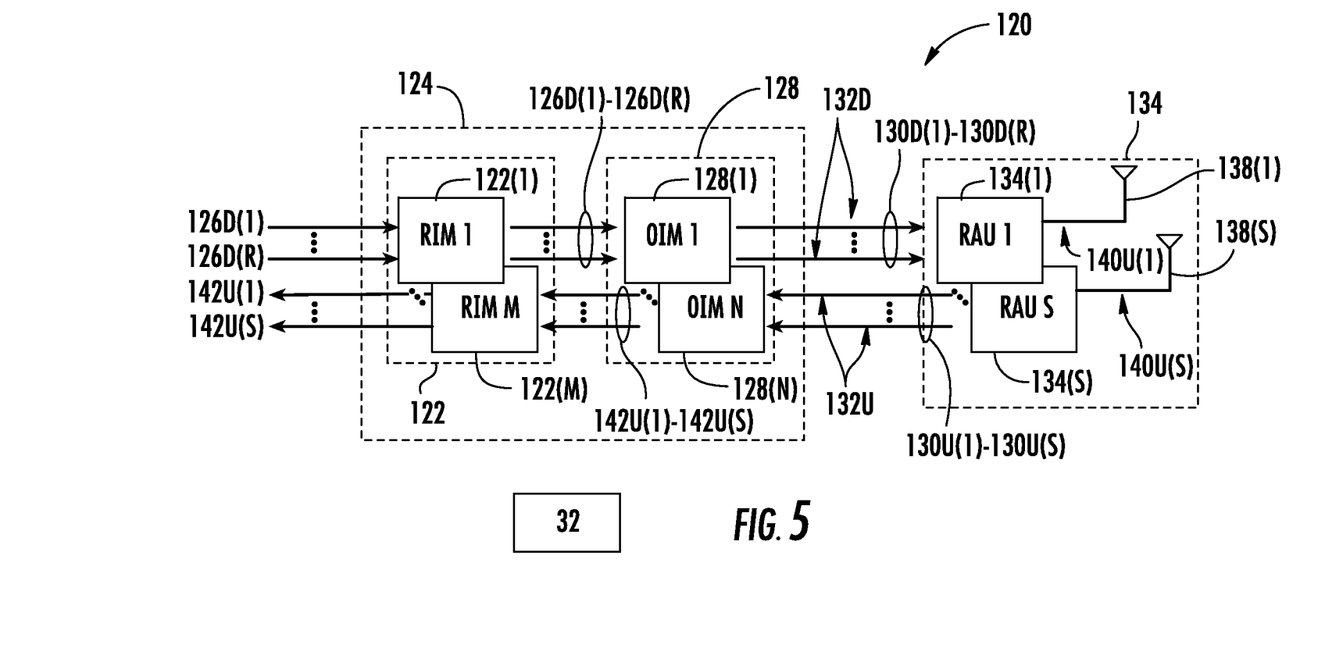
FIG. 5 is a schematic diagram of an exemplary optical fiber-based DAS that can include the gain control system in FIG. 2 to individually control the uplink path gain in the remote units based on the remote unit contribution to the combined uplink power.

The gain control system 32 in the DAS 30 in FIG. 2 can be provided in other DASs as well, without limitation. For example, FIG. 5 is a schematic diagram of another exemplary optical fiber-based DAS 120 that may be employed according to the embodiments disclosed herein to include a gain control system, like the gain control system 32 in FIG. 2, to provide individualized gain control of uplink paths in remote units in a DAS based on individual remote unit contribution to combined uplink power. In this embodiment, the optical fiber-based DAS 120 includes optical fiber for distributing communications services. The optical fiber-based DAS 120 in this embodiment is comprised of three (3) main components. One or more radio interfaces provided in the form of radio interface modules (RIMs) 122(1)-122(M) in this embodiment are provided in a central unit 36 to receive and process downlink electrical communications signals 126D(1)-126D(R) prior to optical conversion into downlink optical communications signals. The RIMs 122(1)-122(M) provide both downlink and uplink interfaces. The notations "1-R" and "1-M" indicate that any number of the referenced component, 1-R and 1-M, respectively, may be provided. The central unit 124 accepts the plurality of RIMs 122(1)-122(M) as modular components that can easily be installed and removed or replaced in the central unit 124. In one embodiment, the central unit 124 is configured to support up to twelve (12) RIMs 122(1)-122(12).

Each RIM 122(1)-122(M) can be designed to support a particular type of radio source or range of radio sources (i.e., frequencies) to provide flexibility in configuring the central unit 124 and the optical fiber-based DAS 120 to support the desired radio sources. For example, one RIM 122 may be configured to support the Personal Communication Services (PCS) radio band. Another RIM 122 may be configured to support the 700 MHz radio band. In this example, by inclusion of these RIMs 122, the central unit 124 could be configured to support and distribute communications signals on both PCS and LTE 700 radio bands, as an example. RIMs 122 may be provided in the central unit 124 that support any frequency bands desired, including but not limited to the US Cellular band, Personal Communication Services (PCS) band, Advanced Wireless Services (AWS) band, 700 MHz band, Global System for Mobile communications (GSM) 900, GSM 1800, and Universal Mobile Telecommunication System (UMTS). The RIMs 122 may also be provided in the central unit 124 that support any wireless technologies desired, including but not limited to Code Division Multiple Access (CDMA), CDMA200, 1×RTT, Evolution—Data Only (EV-DO), UMTS, High-speed Packet Access (HSPA), GSM, General Packet Radio Services (GPRS), Enhanced Data GSM Environment (EDGE), Time Division Multiple Access (TDMA), Long Term Evolution (LTE), iDEN, and Cellular Digital Packet Data (CDPD).

The RIMs 122 may be provided in the central unit 124 that support any frequencies desired, including but not limited to US FCC and Industry Canada frequencies (824-849 MHz on uplink and 869-894 MHz on downlink), US FCC and Industry Canada frequencies (1850-1915 MHz on uplink and 1930-1995 MHz on downlink), US FCC and Industry Canada frequencies (1710-1755 MHz on uplink and 2110-2155 MHz on downlink), US FCC frequencies (698-716 MHz and 776-787 MHz on uplink and 728-746 MHz on downlink), EU R & TTE frequencies (880-915 MHz on uplink and 925-960 MHz on downlink), EU R & TTE frequencies (1710-1785 MHz on uplink and 1805-1880 MHz on downlink), EU R & TTE frequencies (1920-1980 MHz on uplink and 2110-2170 MHz on downlink), US FCC frequencies (806-824 MHz on uplink and 851-869 MHz on downlink), US FCC frequencies (896-901 MHz on uplink and 929-941 MHz on downlink), US FCC frequencies (793-805 MHz on uplink and 763-775 MHz on downlink), and US FCC frequencies (2495-2690 MHz on uplink and downlink).

The downlink electrical communications signals 126D(1)-126D(R) are provided to a plurality of optical interfaces provided in the form of optical interface modules (OIMs) 128(1)-128(N) in this embodiment to convert the downlink electrical communications signals 126D(1)-126D(R) into downlink optical communications signals 130D(1)-130D(R). The notation "1-N" indicates that any number of the referenced component 1-N may be provided. The OIMs 128 may be configured to provide one or more optical interface components (OICs) that contain optical to electrical (O/E) and electrical to optical (E/O) converters, as will be described in more detail below. The OIMs 128 support the radio bands that can be provided by the RIMs 122, including the examples previously described above. Thus, in this embodiment, the OIMs 128 may support a radio band range from 400 MHz to 2700 MHz.

The OIMs 128(1)-128(N) each include E/O converters to convert the downlink electrical communications signals 126D(1)-126D(R) into the downlink optical communications signals 130D(1)-130D(R). The downlink optical communications signals 130D(1)-130D(R) are communicated over downlink optical fiber(s) communications medium 132D to a plurality of remote antenna units 134(1)-134(S). The notation "1-P" indicates that any number of the referenced component 1-P may be provided. O/E converters provided in the remote antenna units 134(1)-134(S) convert the downlink optical communications signals 130D(1)-130D(R) back into the downlink electrical communications signals 126D(1)-126D(R), which are provided to antennas 138(1)-138(S) in the remote antenna units 134(1)-134(S) to client devices in the reception range of the antennas 138(1)-138(S).

E/O converters are also provided in the remote antenna units 134(1)-134(S) to convert uplink electrical communications signals 140U(1)-140U(S) received from client devices through the antennas 138(1)-138(S) into uplink optical communications signals 130U(1)-130U(S) to be communicated over an uplink optical fiber communications medium 132U to the OIMs 128(1)-128(N). The OIMs 128(1)-128(N) include O/E converters that convert the uplink optical communications signals 130U(1)-130U(S) into uplink electrical communications signals 142U(1)-142U(S) that are processed by the RIMs 122(1)-122(M) and provided as uplink electrical communications signals 142U(1)-142U(S). Note that the downlink optical fiber communications medium 132D and uplink optical fiber communications medium 132U connected to each remote antenna unit 134(1)-134(S) may be a common optical fiber communications medium, wherein for example, wave division multiplexing (WDM) may be employed to provide the downlink optical communications signals 130D(1)-130D(S) and the uplink optical communications signals 130U(1)-130U(S) on the same optical fiber communications medium.

Figure 6:
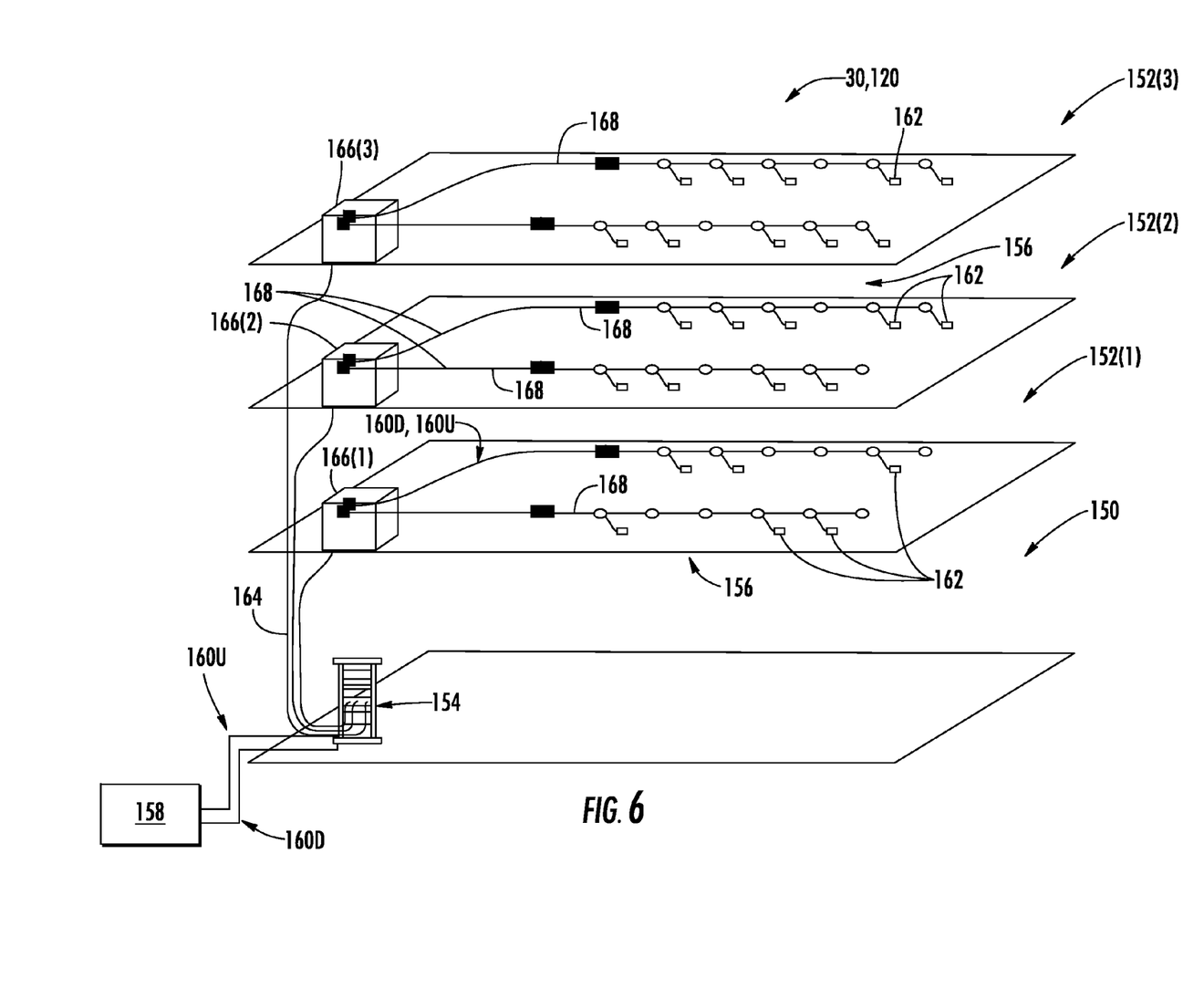
FIG. 6 is a partially schematic cut-away diagram of an exemplary building infrastructure in which the DAS in FIG. 5 can be employed.

The DAS 120 in FIG. 5 may also be provided in an indoor environment, as illustrated in FIG. 6. FIG. 6 is a partially schematic cut-away diagram of a building infrastructure 150 employing the DASs 30, 120 described herein. The building infrastructure 150 in this embodiment includes a first (ground) floor 152(1), a second floor 152(2), and a third floor 152(3). The floors 152(1)-152(3) are serviced by the central unit 154 to provide the antenna coverage areas 156 in the building infrastructure 150. The central unit 154 is communicatively coupled to the base station 158 to receive downlink communications signals 160D from the base station 158. The central unit 154 is communicatively coupled to the remote antenna units 162 to receive the uplink communications signals 160U from the remote antenna units 162, as previously discussed above. The downlink and uplink communications signals 160D, 160U communicated between the central unit 154 and the remote antenna units 162 are carried over a riser cable 164. The riser cable 164 may be routed through interconnect units (ICUs) 166(1)-166(3) dedicated to each floor 152(1)-152(3) that route the downlink and uplink communications signals 160D, 160U to the remote units 162 and also provide power to the remote units 162 via array cables 168.

Figure 7:
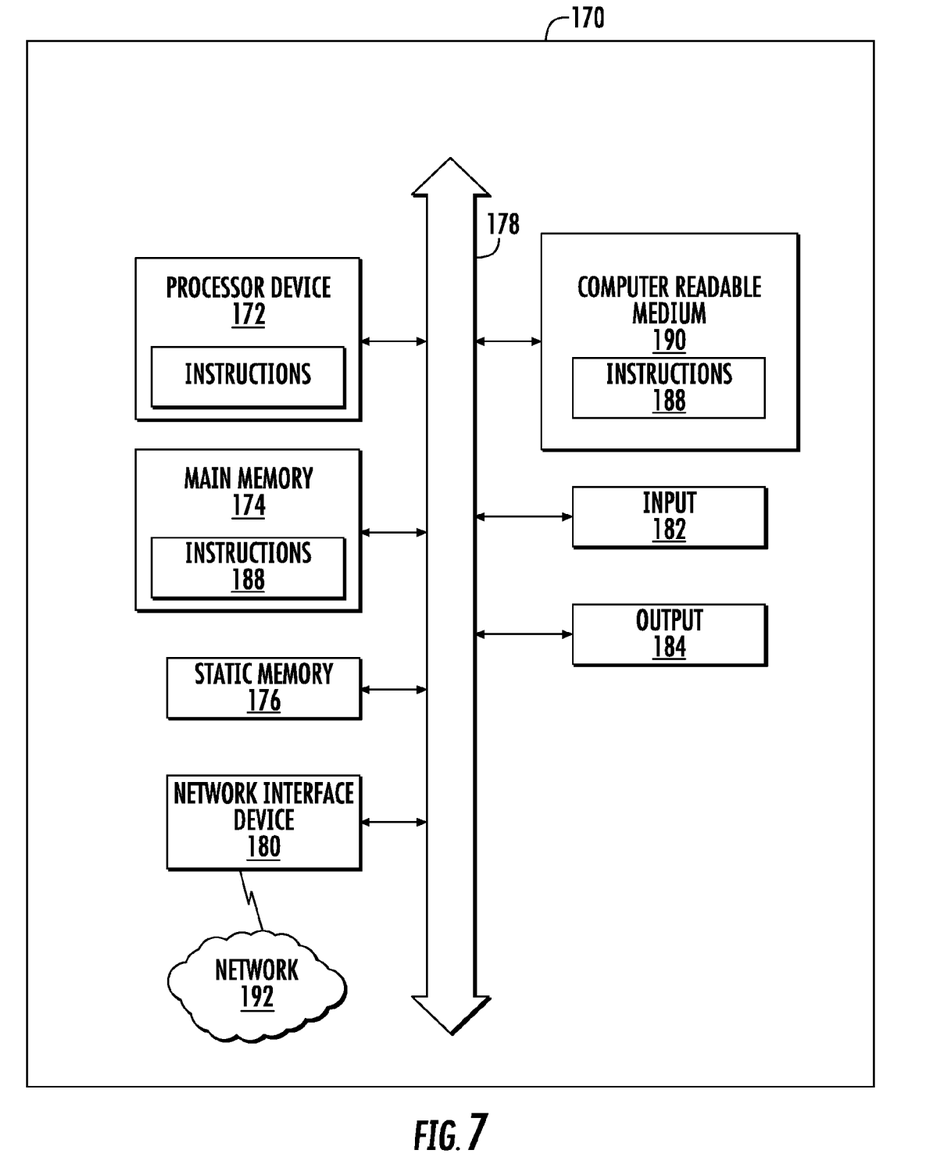
FIG. 7 is a schematic diagram of a generalized representation of an exemplary controller that can be included in any central unit, remote units, wireless client devices, and/or any other components of a DAS.

FIG. 7 is a schematic diagram representation of additional detail illustrating a computer system 170 that could be employed in any controllers disclosed herein, including the central controller 84 and the remote controllers 64(1)-64(P) in the DAS 30 in FIG. 2. The control system 170 is adapted to execute instructions from an exemplary computer-readable medium to perform these and/or any of the functions or processing described herein.

In this regard, the computer system 170 in FIG. 7 may include a set of instructions that may be executed to calculate gain of DAS segment in a DAS. The computer system 170 may be connected (e.g., networked) to other machines in a LAN, an intranet, an extranet, or the Internet. While only a single device is illustrated, the term "device" shall also be taken to include any collection of devices that individually or jointly execute a set (or multiple sets) of instructions to perform any one or more of the methodologies discussed herein. The computer system 170 may be a circuit or circuits included in an electronic board card, such as, a printed circuit board (PCB), a server, a personal computer, a desktop computer, a laptop computer, a personal digital assistant (PDA), a computing pad, a mobile device, or any other device, and may represent, for example, a server or a user's computer.

The exemplary computer system 170 in this embodiment includes a processing device or processor 172, a main memory 174 (e.g., read-only memory (ROM), flash memory, dynamic random access memory (DRAM), such as synchronous DRAM (SDRAM), etc.), and a static memory 176 (e.g., flash memory, static random access memory (SRAM), etc.), which may communicate with each other via a data bus 178. Alternatively, the processor 172 may be connected to the main memory 174 and/or static memory 176 directly or via some other connectivity means. The processor 172 may be a controller, and the main memory 174 or static memory 176 may be any type of memory.

The processor 172 represents one or more general-purpose processing devices, such as a microprocessor, central processing unit, or the like. More particularly, the processor 172 may be a complex instruction set computing (CISC) microprocessor, a reduced instruction set computing (RISC) microprocessor, a very long instruction word (VLIW) microprocessor, a processor implementing other instruction sets, or other processors implementing a combination of instruction sets. The processor 172 is configured to execute processing logic in instructions for performing the operations and steps discussed herein.

The computer system 170 may further include a network interface device 180. The computer system 170 also may or may not include an input 182, configured to receive input and selections to be communicated to the computer system 170 when executing instructions. The computer system 170 also may or may not include an output 184, including but not limited to a display, an alphanumeric input device, and/or a cursor control device.

The computer system 170 may include a data storage device that includes instructions 188 stored in a computer-readable medium 190. The instructions 188 may also reside, completely or at least partially, within the main memory 174 and/or within the processor 172 during execution thereof by the computer system 170, the main memory 174 and the processor 172 also constituting computer-readable medium.

While the medium 190 is shown to be a single medium, the term "computer-readable medium" shall include a single medium or multiple media (e.g., a centralized or distributed database, and/or associated caches and servers) that store the one or more sets of instructions. The term "computer-readable medium" shall include any medium that is capable of storing, encoding, or carrying a set of instructions for execution by the processing device and that cause the processing device to perform any one or more of the methodologies of the embodiments disclosed herein.

The embodiments disclosed herein include various steps. The steps of the embodiments disclosed herein may be formed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes: a machine-readable storage medium (e.g., ROM, random access memory ("RAM"), a magnetic disk storage medium, an optical storage medium, flash memory devices, etc.); and the like.

Unless specifically stated otherwise and as apparent from the previous discussion, it is appreciated that throughout the description, discussions utilizing terms such as "processing," "computing," "determining," "displaying," or the like, refer to the action and processes of a computer system, or similar electronic computing device, that manipulates and transforms data and memories represented as physical (electronic) quantities within the computer system's registers into other data similarly represented as physical quantities within the computer system memories or registers or other such information storage, transmission, or display devices.

The algorithms and displays presented herein are not inherently related to any particular computer or other apparatus. Various systems may be used with programs in accordance with the teachings herein, or it may prove convenient to construct more specialized apparatuses to perform the required method steps. The required structure for a variety of these systems will appear from the description above. In addition, the embodiments described herein are not described with reference to any particular programming language. It will be appreciated that a variety of programming languages may be used to implement the teachings of the embodiments as described herein.

Those of skill in the art will further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The components of the distributed antenna systems described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends on the particular application, design choices, and/or design constraints imposed on the overall system.

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA), or other programmable logic device, a discrete gate or transistor logic, discrete hardware components, or any combination thereof designed to perform the functions described herein. Furthermore, a controller may be a processor. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The embodiments disclosed herein may be embodied in hardware and in instructions that are stored in hardware, and may reside, for example, in RAM, flash memory, ROM, Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

The operational steps described herein may be performed in numerous different sequences other than the illustrated sequences. Furthermore, operations described in a single operational step may actually be performed in a number of different steps. Additionally, one or more operational steps discussed in the exemplary embodiments may be combined. Those of skill in the art will also understand that information and signals may be represented using any of a variety of technologies and techniques. For example, data, instructions, commands, information, signals, bits, symbols, and chips, that may be references throughout the above description, may be represented by voltages, currents, electromagnetic waves, magnetic fields, or particles, optical fields or particles, or any combination thereof.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

Various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A wireless communication system, comprising:
a central unit configured to:
receive at least one downlink communications signal from a network;
distribute the received at least one downlink communications signal to a plurality of remote units;
receive a plurality of uplink communications signals from the plurality of remote units;
combine the received plurality of uplink communications signals into a combined uplink communications signal in a central uplink path; and
distribute the received plurality of uplink communications signals to the network;
a central uplink power measurement circuit coupled to the central uplink path in carrying the combined uplink communications signal, the central uplink power measurement circuit configured to:
measure a combined uplink power of the combined uplink communications signal; and
provide a combined uplink power measurement indicative of the combined uplink power of the combined uplink communications signal;
a central uplink gain control circuit disposed in the central uplink path in the central unit, the central uplink gain control circuit configured to adjust a combined uplink gain of the central uplink path based on a combined uplink gain adjustment signal; and
a central controller configured to:
(a) receive the combined uplink power measurement indicative of the combined uplink power of the combined uplink communications signal;
(b) receive individual remote uplink power measurements of a remote uplink power for each remote uplink path of the plurality of remote units; and
(c) determine if the combined uplink power measurement is greater than a central uplink threshold power level;
(d) if the combined uplink power measurement is greater than the central uplink threshold power level:
identify as a high power remote uplink path, at least one remote uplink path in at least one remote unit among the plurality of remote units that have an individual remote uplink power measurement above a remote uplink threshold power level; and
send at least one remote uplink gain control signal to a remote uplink gain control circuit for the at least one remote uplink path identified as a high power remote uplink path in at least one remote unit among the plurality of remote units, to reduce the uplink gain of the respective remote uplink path by a defined remote uplink gain level reduction;
the plurality of remote units each configured to:
receive the at least one downlink communications signal from the central unit;
distribute the received at least one downlink communications signal to at least one client device;
receive at least one uplink communications signal among the plurality of uplink communications signals in at least one remote uplink path from the at least one client device; and
distribute the received at least one uplink communications signal among the plurality of uplink communications signals to the central unit.

2. The wireless communication system of claim 1, wherein the central controller is configured to repeatedly perform tasks (a)-(d).

3. The wireless communication system of claim 2, wherein if the combined uplink power measurement is greater than a central uplink threshold power level, the central controller is configured to:
identify as the high power remote uplink path, a plurality of remote uplink paths in each remote unit among the plurality of remote units that have the individual remote uplink power measurement above the remote uplink threshold power level; and
direct the remote uplink gain control circuit for each remote uplink path among the plurality of remote uplink paths identified as a high power remote uplink path in each remote unit among the plurality of remote units, to reduce the uplink gain of the respective remote uplink path by a defined remote uplink gain level reduction.

4. The wireless communication system of claim 2, wherein the central uplink gain control circuit comprises a central uplink automatic level control (ALC) circuit configured to limit the combined uplink gain of the central uplink path based on the combined uplink gain adjustment signal;
wherein the central controller is configured to:
determine if the combined uplink power measurement is different that a central uplink threshold power level by being configured to determine if the combined uplink power measurement exceeds the central uplink threshold power level; and
if the combined uplink power measurement exceeds the central uplink threshold power level, send a combined uplink gain adjustment signal to the central uplink gain control circuit to attenuate the combined uplink gain of the central uplink path.

5. The wireless communication system of claim 2, wherein the central uplink gain control circuit comprises a central uplink automatic gain control (AGC) circuit configured to adjust the combined uplink gain of the central uplink path based on the combined uplink gain adjustment signal.

6. The wireless communication system of claim 2, wherein each remote unit among the plurality of remote units further comprises:
at least one remote uplink power measurement circuit coupled to the at least one remote uplink path carrying the received at least one uplink communications signal, the at least one remote uplink power measurement circuit configured to:
measure a remote uplink power of the at least one uplink communications signal in the at least one remote uplink path; and
provide at least one remote uplink power measurement indicative of the remote uplink power of the at least one uplink communications signal in the at least one remote uplink path;
at least one remote uplink gain control circuit disposed in the at least one remote uplink path, the at least one remote uplink gain control circuit configured to adjust the remote uplink gain of the at least one remote uplink path based on at least one remote uplink gain adjustment signal; and at least one remote controller configured to:
receive the at least one remote uplink power measurement indicative of the remote uplink power of the at least one uplink communications signal in the at least one remote uplink path;
generate the at least one remote uplink gain adjustment signal based on the at least one remote uplink power measurement;
receive the at least one remote uplink gain control signal; and
generate the at least one remote uplink gain adjustment signal based on the at least one remote uplink gain control signal.

7. The wireless communication system of claim 6, wherein the at least one remote controller is comprised of a single remote controller.

8. The wireless communication system of claim 6, wherein:
the at least one remote uplink path is comprised of a plurality of remote uplink paths each associated with a frequency band;
the at least one remote uplink power measurement circuit further comprises a plurality of remote uplink power measurement circuits each coupled to a remote uplink path among the plurality of remote uplink paths, each remote uplink power measurement circuit among the plurality of remote uplink power measurement circuits configured to:
measure a remote uplink power of an uplink communications signal among the plurality of uplink communications signals in a remote uplink path among the plurality of remote uplink paths; and
provide a remote uplink power measurement indicative of the remote uplink power of the uplink communications signal in the remote uplink path;
the at least one remote uplink gain control circuit further comprises a plurality of remote uplink gain control circuits disposed in a remote uplink path among the plurality of remote uplink paths, each remote uplink gain control circuit among the plurality of remote uplink gain control circuits configured to adjust the remote uplink gain of the remote uplink path based on a remote uplink gain adjustment signal for the remote uplink path;
at least one remote controller configured to:
receive a plurality of remote uplink power measurements indicative of the remote uplink power of the plurality of uplink communications signals in the plurality of remote uplink paths;
generate a plurality of remote uplink gain adjustment signals each based on a remote uplink power measurement among the plurality of remote uplink power measurements;
receive the at least one remote uplink gain control signal; and
generate a plurality of the remote uplink gain adjustment signals each based on the at least one remote uplink gain control signal.

9. The wireless communication system of claim 6, wherein the at least one remote uplink power measurement circuit and the at least one remote uplink gain control circuit are provided in at least one remote uplink gain control system.

10. The wireless communication system of claim 1, wherein:
the central unit is configured to:
distribute the received at least one downlink communications signal over a plurality of downlink communications media to the plurality of remote units; and
receive an uplink communications signal among the received plurality of uplink communications signals over an uplink communications medium among a plurality of uplink communications media from each remote unit among the plurality of remote units;
each remote unit among the plurality of remote units unit are communicatively coupled to a downlink communications medium among the plurality of downlink communications media, and communicatively coupled to an uplink communications medium among the plurality of uplink communications media;
the plurality of remote units each configured to:
receive the at least one downlink communications signal over a downlink communications medium among the plurality of downlink communications media from the central unit; and
distribute the received at least one uplink communications signal among the plurality of uplink communications signals over an uplink communications medium among the plurality of uplink communications media to the central unit.

11. The wireless communication system of claim 10, wherein each downlink communications medium among the plurality of downlink communications media communicatively coupled to a remote unit among the plurality of remote units, and the uplink communications medium among the plurality of uplink communications media communicatively coupled to the remote unit among the plurality of remote units, are comprised of a common communications medium.

12. The wireless communication system of claim 1, wherein the central unit is configured to receive the plurality of uplink communications signals comprised of a plurality of optical uplink communications signals from the plurality of remote units;
the central unit further comprising a plurality of central optical-to-electrical (O-E) converters each configured to convert a received optical uplink communications signal among the plurality of optical uplink communications signals to an electrical uplink communications signal to provide a plurality of electrical uplink communications signals;
the central unit configured to combine the received plurality of electrical uplink communications signals into a combined electrical uplink communications signal in the central uplink path.

13. A wireless communication system, comprising:
a central unit configured to:
receive at least one downlink communications signal;
distribute the received at least one downlink communications signal to a plurality of remote units;
receive a plurality of optical uplink communications signals from the plurality of remote units;
combine the received plurality of optical uplink communications signals into a combined uplink communications signal in a central uplink path; and
distribute the received plurality of optical uplink communications signals;
a central uplink power measurement circuit coupled to the central uplink path in carrying the combined uplink communications signal, the central uplink power measurement circuit configured to:
  measure a combined uplink power of the combined uplink communications signal; and
  provide a combined uplink power measurement indicative of the combined uplink power of the combined uplink communications signal;
a central uplink gain control circuit disposed in the central uplink path in the central unit, the central uplink gain control circuit configured to adjust a combined uplink gain of the central uplink path based on a combined uplink gain adjustment signal; and
a central controller configured to:
  (a) receive the combined uplink power measurement indicative of the combined uplink power of the combined uplink communications signal;
  (b) receive individual remote uplink power measurements of a remote uplink power for each remote uplink path of the plurality of remote units; and
  (c) determine if the combined uplink power measurement is greater than a central uplink threshold power level;
  (d) if the combined uplink power measurement is greater than the central uplink threshold power level:
    identify as a high power remote uplink path, at least one remote uplink path in at least one remote unit among the plurality of remote units that have an individual remote uplink power measurement above a remote uplink threshold power level; and
    send at least one remote uplink gain control signal to a remote uplink gain control circuit for the at least one remote uplink path identified as a high power remote uplink path in at least one remote unit among the plurality of remote units, to reduce the uplink gain of the respective remote uplink path by a defined remote uplink gain level reduction;
the plurality of remote units each configured to:
  receive the at least one downlink communications signal from the central unit;
  distribute the received at least one downlink communications signal to at least one client device;
  receive at least one uplink communications signal in at least one remote uplink path from the at least one client device; and
  distribute the received at least one uplink communications signal as at least one optical uplink communications signal among the plurality of optical uplink communications signals to the central unit.

14. The wireless communication system of claim 13, wherein the central controller is configured to repeatedly perform tasks (a)-(d), and wherein the remote units are distributed among multiple floors of a building infrastructure.

15. The wireless communication system of claim 14, wherein the central uplink gain control circuit comprises a central uplink automatic gain control (AGC) circuit configured to adjust the combined uplink gain of the central uplink path based on the combined uplink gain adjustment signal.

16. The wireless communication system of claim 14, wherein the central unit is configured to distribute the received at least one downlink communications signal over a plurality of optical downlink communications media to the plurality of remote units.

17. The wireless communication system of claim 16, wherein each remote unit is communicatively coupled to an optical downlink communications medium among the plurality of optical downlink communications media.

* * * * *

UNITED STATES PATENT AND TRADEMARK OFFICE
CERTIFICATE OF CORRECTION

PATENT NO. : 9,980,237 B2
APPLICATION NO. : 15/618237
DATED : May 22, 2018
INVENTOR(S) : Dror Harel Page 1 of 1

It is certified that error appears in the above-identified patent and that said Letters Patent is hereby corrected as shown below:

In the Claims

In Column 20, Line 14, Claim 10, delete "units unit" and insert -- units --, therefor.

Signed and Sealed this
Twenty-eighth Day of September, 2021

Drew Hirshfeld
*Performing the Functions and Duties of the*
*Under Secretary of Commerce for Intellectual Property and*
*Director of the United States Patent and Trademark Office*